(12) United States Patent
Tang et al.

(10) Patent No.: US 8,441,811 B2
(45) Date of Patent: May 14, 2013

(54) AC-DC CONVERTER

(75) Inventors: Pak-Chuen Tang, Hong Kong (CN); Kwong-Ming Ching, Hong Kong (CN); Chung-Hei Poon, Hong Kong (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 261 days.

(21) Appl. No.: 13/019,661

(22) Filed: Feb. 2, 2011

(65) Prior Publication Data
US 2012/0087155 A1    Apr. 12, 2012

(30) Foreign Application Priority Data
Oct. 12, 2010 (CN) .......................... 2010 1 0513991

(51) Int. Cl.
*H02M 3/335* (2006.01)
(52) U.S. Cl.
USPC .......... 363/18; 363/20; 363/21.02; 363/21.12
(58) Field of Classification Search .................... 363/18, 363/19, 20, 21.01, 21.02, 21.03, 21.04, 21.12
See application file for complete search history.

(56) References Cited

U.S. PATENT DOCUMENTS

| | | | | |
|---|---|---|---|---|
| 3,916,281 | A | * | 10/1975 | Owen ........................ 363/21.17 |
| 5,901,051 | A | * | 5/1999 | Takahashi et al. .......... 363/21.18 |
| 2008/0037293 | A1 | * | 2/2008 | Jacques et al. ............. 363/21.03 |

* cited by examiner

*Primary Examiner* — Nguyen Tran
(74) *Attorney, Agent, or Firm* — Kirton McConkie; Evan R. Witt

(57) ABSTRACT

An AC-DC converter is disclosed. The AC-DC converter includes an OFF-time clamping circuit. The OFF time clamping circuit outputs a triggering signal when a main switch circuit of the AC-DC converter is switched from ON state to OFF state. When an input AC voltage is too small, and a terminal voltage at a first current-conducting terminal of the main switch circuit of the AC-DC converter is lower than a specific voltage such that a switching control circuit can not turn on the main switch circuit again, the switching control circuit can still turn on the main switch circuit again by the triggering signal. Therefore, the OFF time of the main switch circuit is clamped. The switching control circuit can control the switching operation of the main switch circuit.

16 Claims, 5 Drawing Sheets

AC-DC CONVERTER

FIELD OF THE INVENTION

The invention is related to an AC-DC converter, and more particularly to an AC-DC converter having a switching control circuit capable of turning on the main switch circuit once again when an inputting alternating voltage is too small and the main switch circuit is switched from ON state to OFF state.

BACKGROUND OF THE INVENTION

AC-DC converter is used to convert an input AC voltage into an operating DC voltage for driving a DC load, such as a magnetron used for a microwave or a gas discharge lamp.

The conventional AC-DC converter generally includes a main switch circuit, a transformer, a resonant capacitor, and a switching control circuit. The resonant capacitor is connected to the current-conducting terminal of the main switch circuit, and constitutes a quasi-resonance circuit with the magnetizing inductance of the transformer. When the main switch circuit is switched from ON state to OFF state, the terminal voltage at the current-conducting terminal of the main switch circuit is fluctuated by way of the resonance of the resonant capacitor and the magnetizing inductance of the transformer. The main switch circuit is connected to the primary winding of the transformer, and the control terminal of the main switch circuit is connected to the switching control circuit. The switching operation of the main switch circuit is regulated by the control signal outputted from the switching control circuit, such that the energy of the input AC voltage received by the primary winding of the transformer is transferred to the secondary winding of the transformer by way of electromagnetic induction. Thus, an AC voltage is induced across the secondary winding of the transformer. The switching control circuit is also connected to a current-conducting terminal of the main switch circuit in order to detect the terminal voltage of the connected current-conducting terminal. When the main switch circuit is switched from ON state to OFF state and the switching control circuit detects that the terminal voltage is higher than a specific voltage, the switching control circuit turns on the main switch circuit again to allow the main switch circuit to switch under zero-voltage conditions. In addition, the switching control circuit is preset with a maximum OFF time. When the main switch circuit is switched from ON state to OFF state but the switching control circuit can not detect the terminal voltage at the current-conducting terminal of the main switch circuit to turn on the main switch circuit again, the switching control circuit turns on the main switch circuit again in a passive way as the OFF time of the main switch circuit reaches the predetermined maximum OFF time.

FIG. 1 shows the signal waveforms and voltage waveforms of the input AC voltage, the control signal outputted from the switching control circuit, and the terminal voltage at the current-conducting terminal of the main switch circuit. As shown in FIG. 1, when the main switch circuit is switched from ON state to OFF state at the time t1, the terminal voltage of the main switch circuit is fluctuating between the time t1 and the time t2 as a result of the resonance of the resonant capacitor and the magnetizing inductance of the transformer. When the switching control circuit detects that the terminal voltage between the time t1 and the time t2 is higher than a specific voltage, the switching control circuit changes the level of the control signal at the time t2 and thus turns on the main switch again.

Although the switching control circuit of the conventional AC/DC converter is able to turn on the main switch circuit again by detecting if the terminal voltage at the current-conducting terminal of the main switch circuit is higher than a specific voltage, the magnitude of the terminal voltage corresponds to the magnitude of the energy stored in the primary winding of the transformer as the main switch circuit is turned on, and the magnitude of the energy stored in the primary winding of the transformer as the main switch circuit is turned on corresponds to the magnitude of the input AC voltage. If the input AC voltage is too small, i.e. the input AC current is too small, the energy stored in the primary winding of the transformer as the main switch circuit is turned on will be less. If the input AC voltage is too small as the main switch circuit is switched from ON state to OFF state at the time to, the terminal voltage at the current-conducting terminal of the main switch circuit will not be higher than the specific voltage as the input AC voltage is too small. Under this condition, the switching control circuit is not able to detect the terminal voltage and turn on the main switch circuit again. Thus, the switching control circuit is allowed to turn on the main switch circuit again in a passive way only when the OFF time of the main switch circuit reaches the predetermined maximum OFF time, e.g. the period of Ton. Hence, the switching control circuit of the conventional AC-DC converter is not able to control the switching operation of the main switch circuit as the input AC voltage is too small.

To address the aforementioned problems that the switching control circuit of the AC-DC converter is not able to control the switching operation of the main switch circuit as the input AC voltage is too small, some AC-DC converter is configured to allow the switching control circuit to shut down as the input AC voltage is too small. Nonetheless, such AC-DC converter will possess small conduction angle, which in turn result in higher operating current for the AC-DC converter. Hence, the circuit elements of the AC-DC converter, e.g. the resonant capacitor, the main switch circuit, and the transformer, are likely to undergo strong voltage stress and become vulnerable.

Also, some contemporary AC-DC converters are configure to extend the ON time of main switch circuit as the input AC voltage is too small in order to ensure the energy stored in the primary winding of the transformer is sufficient as the main switch is turned on. Thus, the terminal voltage at the current-conducting terminal of the main switch circuit is able to exceed the specific voltage as the main switch circuit is switched from ON state to OFF state, thereby driving the switching control circuit to turn on the main switch circuit again. Nevertheless, the switching control circuit of such AC-DC converter requires sophisticated electronic elements and structures. In this way, the manufacturing cost of the AC-DC converter will be boosted. Furthermore, such AC-DC converter will be have a reduced switching frequency as the input AC voltage is too small due to the extension of ON time of the main switch circuit. As an example, the switching frequency of the main switch circuit can be reduced to 20 kHz. Thus, the AC-DC converter is likely to produce noises as the input AC voltage is too small.

SUMMARY OF THE INVENTION

An aspect of the invention is to provide an AC-DC converter that can eliminate one of the aforementioned drawbacks that the switching control circuit of the AC-DC converter is not able to control the switching operation of the main switch circuit as the input AC voltage is too small. The inventive AC-DC converter does not require sophisticated electronic elements and structures. Thus, the inventive AC-DC converter has low manufacturing cost and low noise.

According to one embodiment of the present invention provides an AC-DC converter including a rectifier for rectifying an input AC voltage; a first filter circuit connected to the rectifier for suppressing the electromagnetic interference and high-frequency noises to generate an intermediate DC voltage; a transformer having a primary winding connected to the first filter circuit and a secondary winding; a main switch circuit connected to the primary wining for controlling the energy transfer between the primary winding and the secondary winding; a quasi-resonance circuit connected to the first current-conducting terminal of the main switch circuit; a switching control circuit connected to the first current-conducting terminal of the main switch circuit and the control terminal of the main switch circuit for outputting a switching control signal to turn on or off the main switch circuit. When the main switch circuit is switched from ON state to OFF state, the switching control circuit detects if the terminal voltage of the first current-conducting terminal of the main switch circuit exceeds a specific voltage, thereby determining if the main switch circuit is to be turned on again. The AC-DC converter also includes an OFF time clamping circuit connected to the control terminal of the main switch circuit and the first current-conducting terminal of the main switch circuit for providing a triggering signal to the first current-conducting terminal of the main switch circuit. When the terminal voltage does not exceed the specific voltage, the switching control circuit turns on the main switch circuit again by the triggering signal.

Now the foregoing and other features and advantages of the present invention will be best understood through the following descriptions with reference to the accompanying drawings, wherein:

DESCRIPTION OF THE PREFERRED EMBODIMENT

Several exemplary embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 1:
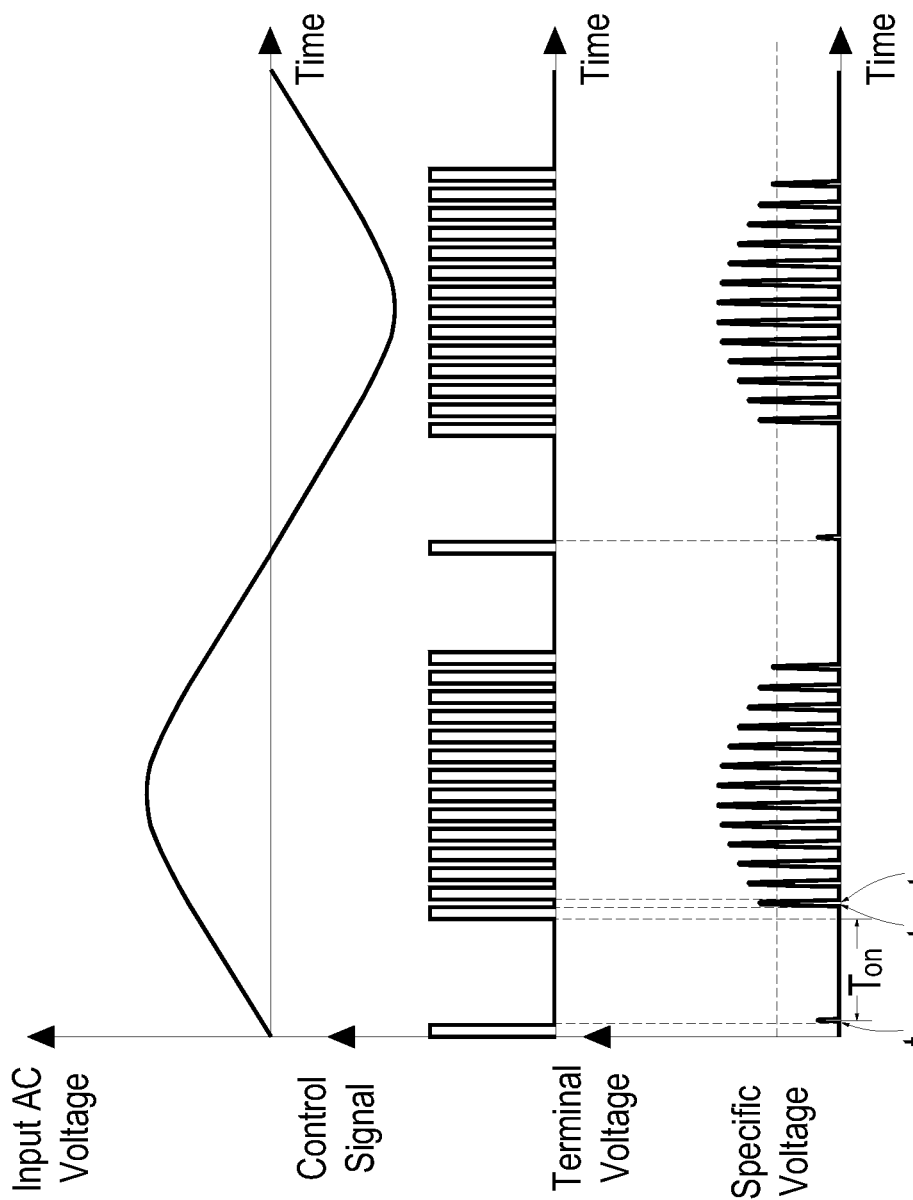
FIG. 1 shows the signal waveforms and voltage waveforms of the input AC voltage, the control signal outputted from the switching control circuit, and the terminal voltage at the current-conducting terminal of the main switch circuit according to the prior art.
Figure 2:
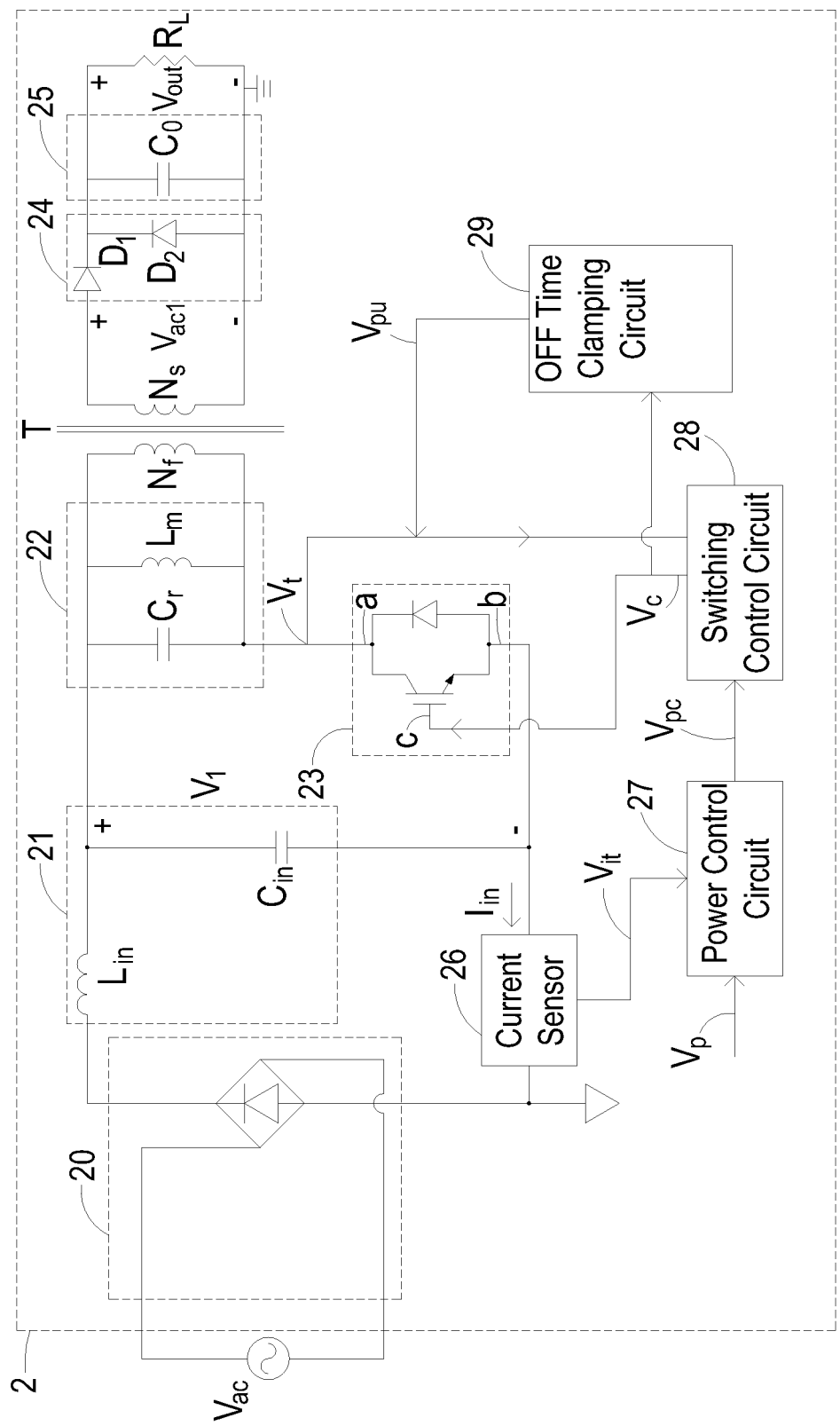
FIG. 2 is a circuit block diagram showing the circuitry of an AC-DC converter according to one embodiment of the invention.

FIG. 2 shows the circuit blocks of an AC-DC converter of one embodiment of the invention. In this embodiment, the AC-DC converter is a quasi-resonance AC-DC converter. As shown in FIG. 2, the quasi-resonance AC-DC converter 2 includes a bridge rectifier 20, an first filter circuit 21, a quasi-resonance circuit 22, a main switch circuit 23, a transformer T, a rectifier 24, a second filter circuit 25, a current sensor 26, a power control circuit 27, a switching control circuit 28, and an OFF time clamping circuit 29.

The bridge rectifier 20 is used to rectify an input AC voltage Vac. The first filter circuit 21 is connected to the output end of the bridge rectifier 20 for suppressing the electromagnetic interference and high-frequency noises to generate an intermediate DC voltage V1. The intermediate DC voltage is generated by half-wave rectifying the input AC voltage Vac or full-wave rectifying the input AC voltage Vac, and suppressing the high-frequency noises with frequency being above the frequency of the input AC voltage Vac such as 60 Hz. In this embodiment, the first filter circuit 21 may be made up of a filtering inductor Lin and a filtering capacitor Cin.

A first current-conducting terminal a of the main switch circuit 23 is connected in series with the primary winding Nf of the transformer T. A second current-conducting terminal b of the main switch circuit 23 is connected to the current sensor 26. The main switch circuit 23 is configured to turn on or off to control the energy transfer between the primary winding Nf and the secondary winding Ns of the transformer T. In other words, the transformer T is configured to transfer the energy stored in the primary winding Nf to the secondary winding Ns by way of electromagnetic induction according to the switching operation of the main switch circuit 23. In this way, an AC voltage Vac1 is induced across the secondary winding Ns. In this embodiment, the main switch circuit 23 is made up of an insulated gate bipolar transistor (IGBT). Therefore, the first current-conducting terminal a of the main switch circuit 23 is the drain terminal, and the second current-conducting terminal b of the main switch circuit 23 is the source terminal. The control terminal c of the main switch circuit 23 is the gate terminal. Alternatively, the main switch circuit 23 may be made up of a MOSFET.

The quasi-resonance circuit 22 is connected to the first filter circuit 21, the first current-conducting terminal a of the main switch circuit 23, and the primary winding Nf of the transformer T. The quasi-resonance circuit 22 may be made up of a resonant capacitor Cr and the magnetizing inductance Lm of the transformer T. The resonant capacitor Cr and the magnetizing inductance Lm are respectively connected in parallel with the primary winding Nf, and are jointly connected to the first current-conducting terminal a of the main switch circuit 23. When the main switch circuit 23 is switched from ON state to OFF state, the resonant capacitor Cr and the magnetizing inductance Lm generates resonance in order to influence the terminal voltage Vt at the first current-conducting terminal a, thereby fluctuating the terminal voltage Vt.

The rectifier 24 is connected to the secondary winding Ns for rectifying the input AC voltage Vac1. In this embodiment, the rectifier 24 may be made up of a first rectifying diode D1 and a second rectifying diode D2. The second filter circuit 25 is connected to the rectifier 24 for filtering the voltage outputted from the rectifier 24 and outputting an operating DC voltage Vout to power a load $R_L$, such as the magnetron used for a microwave or a gas discharge lamp. In this embodiment, the second filter circuit 25 may be made up of an output capacitor Co.

The current sensor 26 is connected to the second current-conducting terminal b of the main switch circuit 23 and the power control circuit 27, and may be made up of a current-sensing resistor (not shown) or a current transformer (not shown). The current sensor 26 is used to detect the input current Iin flowing through the main switch circuit 23 as the main switch circuit 23 is turned on, thereby outputting an input current sensing signal Vit to the power control circuit 27. The power control circuit 27 is connected to the switching control circuit 28 for comparing the input current sensing signal Vit with an external input power control signal Vp, and in response thereto outputting a power control signal Vpc to the switching control circuit 28. In this embodiment, the external input power control signal Vp represents the desired output power which is inputted by the user. For example, if the DC voltage level of the external input power control signal Vp is 5V, it indicates that the desired output power is 100 W.

The switching control circuit 28 is connected to the power control circuit 27, the control terminal c of the main switch circuit, and the first current-conducting terminal a of the main switch circuit. The switching control circuit 28 is used to output a switching control signal Vc to turn on or off the main switch circuit 23. The main switch circuit 23 is configured to regulate the switching control signal Vc according to the power control signal Vpc, thereby adjusting the ON time of the main switch circuit and adjusting the output power of the AC-DC converter 2. When the main switch circuit 23 is switched from ON state to OFF state, the switching control signal 28 is able to detect if the terminal voltage Vt at the first current-conducting terminal a exceeds a specific voltage Vth shown in FIG. 4, and in response thereto determine whether the main switch circuit 23 is turned on again or not.

An input terminal of the OFF time clamping circuit 29 is connected to the control terminal c of the main switch circuit 23 for receiving the switching control signal Vc. An output terminal of the OFF time clamping circuit 29 is connected to the first current-conducting terminal a of the main switch circuit 23. The OFF time clamping circuit 29 is used to output a triggering signal Vpu as the main switch circuit 23 is switched from ON state to OFF state. The triggering signal Vpu is used to trigger the main switch circuit 23 to turn on again when the terminal voltage Vt at the first current-conducting terminal a does not exceed the specific voltage Vth by way of the resonance of the quasi-resonance circuit 22 as a result of a small input AC voltage Vac, the main switch circuit 23 can be turned on again by the triggering signal Vpu. Therefore, the OFF time of the main switch circuit 23 is clamped.

It can be understood from the above descriptions that as the switching control circuit 28 controls the main switch circuit 23 to switch from ON state to OFF state, the switching control circuit 28 can directly control the main switch circuit 23 to turn on if the switching control circuit 28 detects that the terminal voltage Vt at the first current-conducting terminal a exceeds the specific voltage Vth by way of resonance of the quasi-resonance circuit 22. However, if the terminal voltage Vt at the first current-conducting terminal a does not exceed the specific voltage Vth by way of resonance of the quasi-resonance circuit 22 as a result of a small input AC voltage Vac, the switching control circuit 28 turns on the main switch circuit 23 again by way of a triggering signal outputted Vpu from the OFF time clamping circuit 29, thereby clamping the OFF time of the main switch circuit 23. In this way, even if the input AC voltage Vac is too small, the main switch circuit 23 can control the switching operation of the main switch circuit 23 to allow the main switch circuit 23 to switch under zero-voltage conditions.

In summary, the inventive AC-DC converter 2 includes a switching control circuit 28 to control the main switch circuit 23 to operate when the input AC voltage Vac is too small. Thus, the inventive AC-DC converter 2 does not need to shut down the switching control circuit 28 or extend the ON time of the main switch circuit 23 when the input AC voltage Vac is too small. As a result, the electronic elements of the inventive AC-DC converter 2 does not need to undergo severe voltage stress and are invulnerable. Furthermore, the noise is subdued when the inventive AC-DC converter 2 is in operation. More advantageously, the inventive AC-DC converter 2 may be made up by simple and cheap electronic elements and structures, thereby deflating the manufacturing cost.

Figure 3:
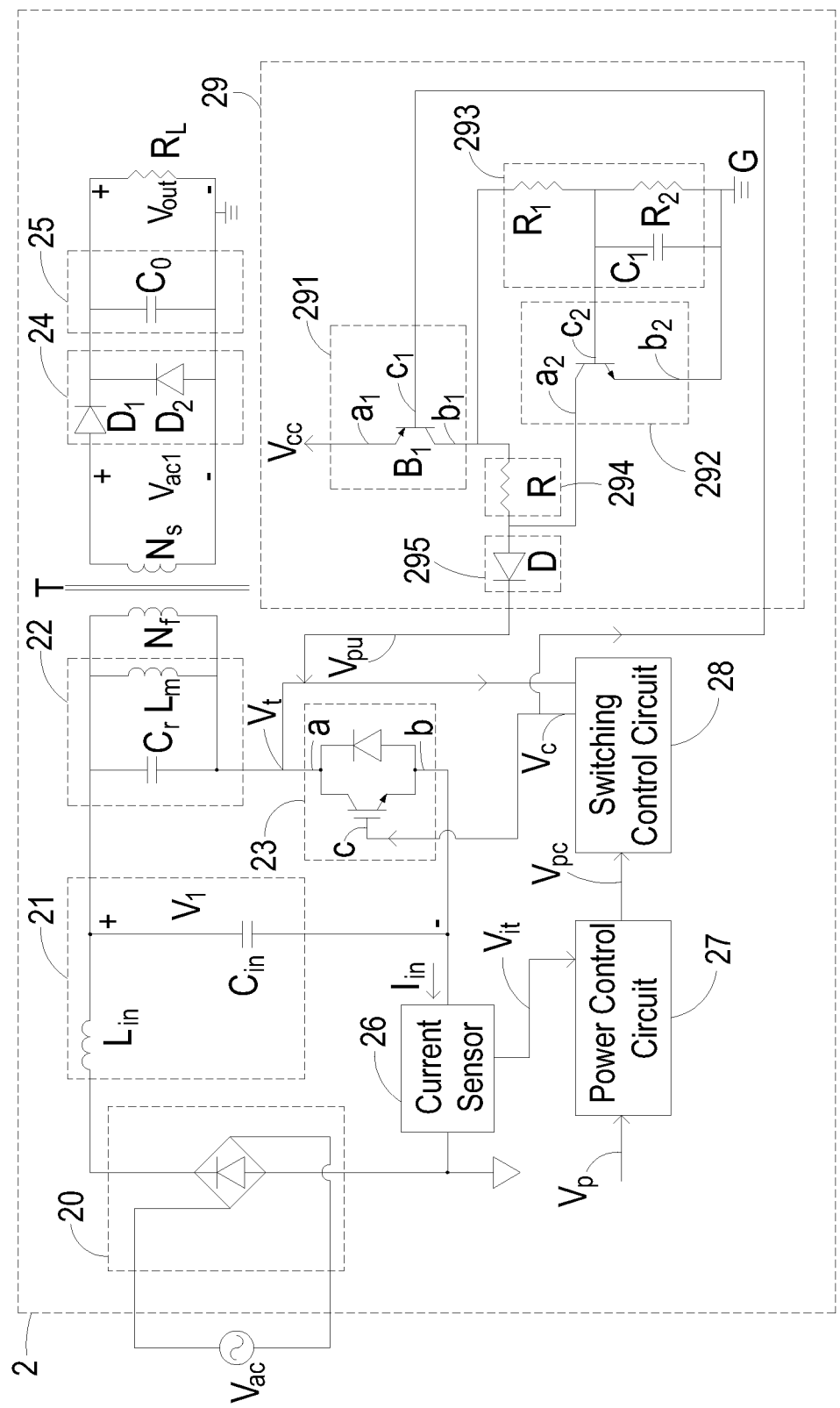
FIG. 3 is a circuit block diagram showing the detailed circuitry of an AC-DC converter according to another embodiment of the invention.

Referring to FIGS. 2 and 3, in which FIG. 3 shows one embodiment of the detailed circuitry of the AC-DC converter of FIG. 2. The OFF time clamping circuit 29 includes a first switch circuit 291, a second switch circuit 292, a first delay circuit 293, a current-limiting element 294, and a reverse current isolation circuit 295. The reverse current isolation circuit 295 is connected to the first current-conducting terminal a of the main switch circuit 23 and the current-limiting element 294, and may be made up of a diode D. The reverse current isolation circuit 295 is used to prevent a reverse current from flowing from the first current-conducting terminal a of the main switch circuit 23 to the OFF time clamping circuit 29. The current-limiting element 294 is connected to the reverse current isolation circuit 295 and the second current-conducting terminal b1 of the first switch circuit 291, and may be made up of a current-limiting resistor R for limiting the current outputted from the OFF time clamping circuit 291.

The first current-conducting terminal a1 of the first switch circuit 291 is used to receive a supply DC voltage Vcc and the second current-conducting terminal b1 of the first switch circuit 291 is connected to the current-limiting element 294. The second current-conducting terminal b1 of the first switch circuit 291 is also connected to the output end of the OFF time clamping circuit 29 through the current-limiting element 294 and the reverse current isolation circuit 295. The control terminal c1 of the first switch circuit 291 is connected to the control terminal c of the main switch circuit 23 to receive the switching control signal Vc. The first switch circuit 291 is configured to turn on when the voltage level of the switching control signal Vc is lower than the voltage level of the supply DC voltage Vcc. In this embodiment, the first switch circuit 291 is made up of a PNP-type BJT. Hence, the first current-conducting terminal a1 of the first switch circuit 291 is the emitter; the second current-conducting terminal b1 of the first switch circuit 291 is the collector; and the control terminal c1 of the first switch circuit 291 is the base.

In some embodiments, the level of switching control signal Vc under the enabling state, for example, 11V, is higher than the level of the supply DC voltage Vcc which is 5V for example. the level of switching control signal Vc under the disabling state, for example, 0V, is lower than the level of the supply DC voltage Vcc.

The first delay circuit 293 is connected to the second current-conducting terminal b1 of the first switch circuit 291, the control terminal c2 of the second switch circuit 292, and a ground terminal G for delaying the time for the control terminal c2 of the second switch circuit 292 to receive the supply DC voltage Vcc. Thus, the second switch circuit 292 can be turned on after the first switch circuit 291 is turned on. In this embodiment, the first delay circuit 293 is made up of a first resistor R1, a second resistor R2, and a first capacitor C1. The first resistor R1 is connected between the second current-conducting terminal b1 of the first switch circuit 291 and the control terminal c2 of the second switch circuit 292. The second resistor R2 is connected between the first resistor R1 and the ground terminal G. The first capacitor C1 is connected in parallel with the second resistor R2.

The first current-conducting terminal a2 of the second switch circuit 292 is connected to the current-limiting element 294 and the reverse current isolation circuit 295, and is connected to the output end of the OFF time clamping circuit 29 through the current-limiting element 294 and the reverse current isolation circuit 295. The second current-conducting terminal b2 of the second switch circuit 292 is connected to the ground terminal G. When the first switch circuit 291 is switched from OFF state to ON state, the supply DC voltage Vcc will be delivered to the control terminal c2 of the second switch circuit 292 through the first switch circuit 291 after a predetermined period of time under the influence of the first delay circuit 293. Under this condition, the second switch circuit 292 is turned on a predetermined period of time after the first switch circuit 291 is turned on. In this embodiment, the second switch circuit 292 may be made up of a NPN-type BJT. In this way, the first current-conducting terminal a2 of the second switch circuit 292 is the collector; the second current-conducting terminal b2 of the second switch circuit 292 is the emitter; and the control terminal c2 of the second switch circuit 292 is the base.

Figure 4:
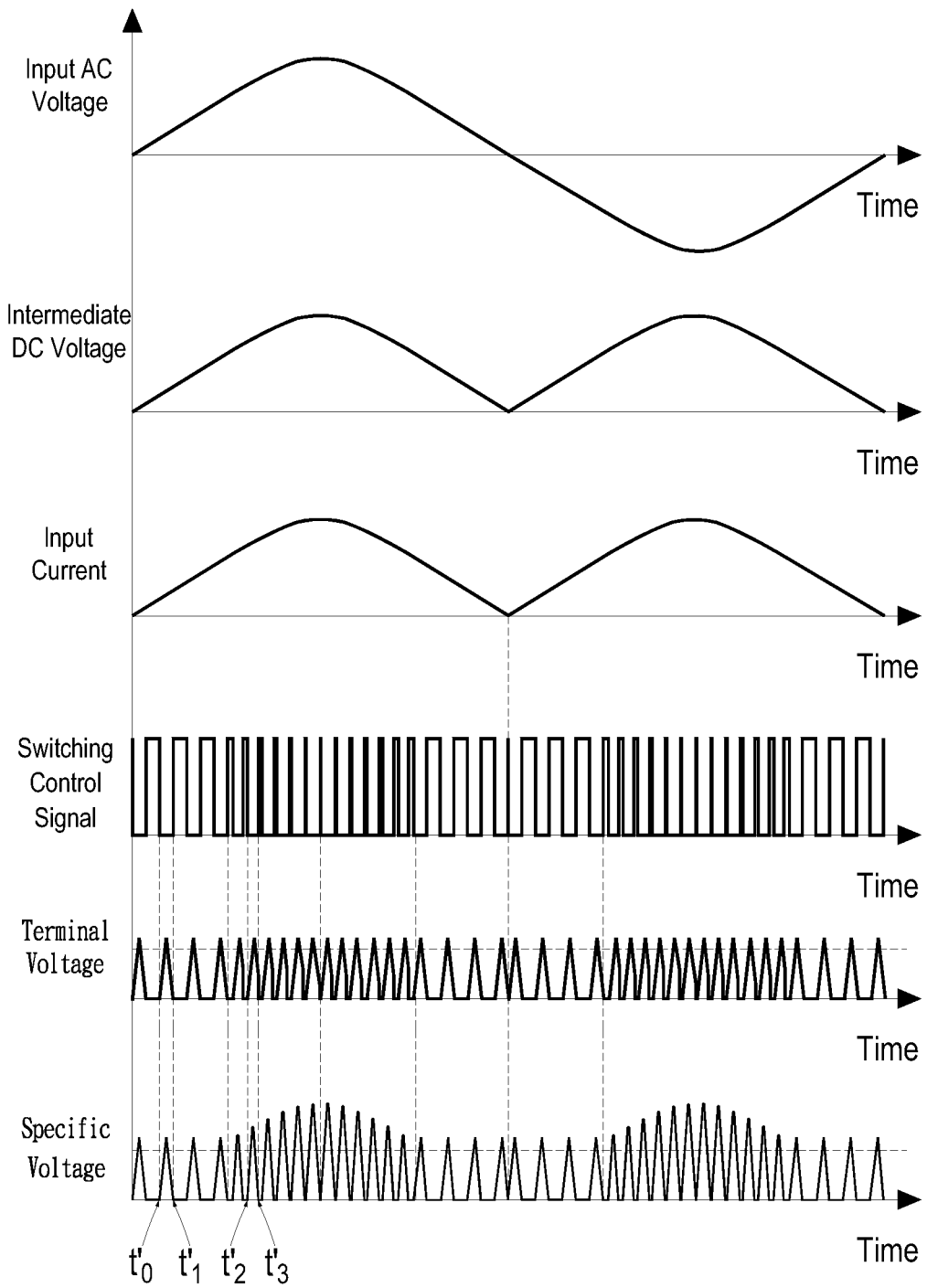
FIG. 4 shows the signal waveforms and voltage waveforms of the input AC voltage, the intermediate DC voltage, the switching control signal, the terminal voltage at the current-conducting terminal of the main switch circuit, and the triggering signal according to one embodiment of the invention.

The operation of the AC-DC converter 2 shown in FIG. 3 will be described as follows. Referring to FIGS. 3 and 4, in which FIG. 4 shows the signal waveforms and voltage waveforms of the input AC voltage, the intermediate DC voltage, the switching control signal, the terminal voltage at the current-conducting terminal of the main switch circuit, and the triggering signal according to one embodiment of the invention. When the AC-DC converter 2 receives the input AC voltage Vac and starts operating, the switching control circuit 28 outputs the switching control signal Vc under an enabling state to turn on the main switch circuit 23. In the meantime, the level of the switching control signal Vc is higher than the level of the supply DC voltage Vcc. Thus, the first switch circuit 291 is turned off, and the triggering signal Vpu outputted from the OFF time clamping circuit 29 is zero.

Next, the switching control circuit 28 switches the state of the switching control signal Vc to a disabling state (0V) after a period of time according to the power control signal Vpc. Under this condition, the main switch circuit 23 is switched from ON state to OFF state. In the meantime, the terminal voltage Vt at the first current-conducting terminal a starts fluctuating. Under this condition, the level of the switching control signal Vc is lower than the supply DC voltage Vcc, and thus a voltage drop is created between the first current-conducting terminal a1 of the first switch circuit 291 and the control terminal c1 of the first switch circuit 291. The voltage drop is 0.6V, for example. Hence, the first switch circuit 291 is turned on, and the energy of the supply DC voltage Vcc is transferred to the output end of the OFF time clamping circuit 29 through the first switch circuit 291, the current-limiting element 294, and the reverse current isolation circuit 295. Therefore, the level of the triggering signal Vpu is boosted to exceed the specific voltage Vth. Also, the first delay circuit 293 delays the transfer of the supply DC voltage Vcc to the control terminal c2 of the second switch circuit 292. Hence, the second switch circuit 292 is turned on a predetermined period of time after the first switch circuit 291 is turned on. When the second switch circuit 292 is turned on, the level of the triggering signal Vpu will be descended to zero as the output end of the OFF time clamping circuit 29 is connected to the ground terminal G. In other words, when the main switch circuit 23 is switched from ON state to OFF state, the OFF time clamping circuit 29 outputs a triggering signal Vpu which exceeds the specific voltage Vth.

It can be realized from the above statements that as the switching control circuit 28 controls the main switch circuit 23 to switch from ON state to OFF state, the switching control circuit 28 turns on the main switch circuit 23 again if the switching control circuit 28 detects that the terminal voltage Vt at the first current-conducting terminal a exceeds the specific voltage Vth during the period of t2'-t3'. However, if the terminal voltage Vt at the first current-conducting terminal a can not exceed the specific voltage with by way of the resonance of the quasi-resonance circuit 22 during the period of t0'-t1', the switching control circuit 28 still can turn on the main switch circuit 23 again by the triggering signal Vpu outputted from the OFF time clamping circuit 29. Under this condition, the OFF time of the main switch circuit 23 is clamped. Therefore, the switching control circuit 28 can control the switching operation of the main switch circuit 23 even if the input AC voltage Vac is too small, thereby allowing the main switch circuit 23 to switch under zero-voltage conditions.

Also, it can be known from FIG. 4 that as the intermediate DC voltage V1 or the DC voltage generated by full-wave rectifying the input AC voltage Vac increases, the switching frequency of the main switch circuit 23 increases as well. As the intermediate DC voltage V1 or the DC voltage generated by full-wave rectifying the input AC voltage Vac decreases, the switching frequency of the main switch circuit 23 decreases as well. Hence, the output power of the AC-DC converter 2 can be regulated by regulating the switching frequency of the main switch circuit 23. Also, the harmonics of the input current Iin can be suppressed as well.

Figure 5:
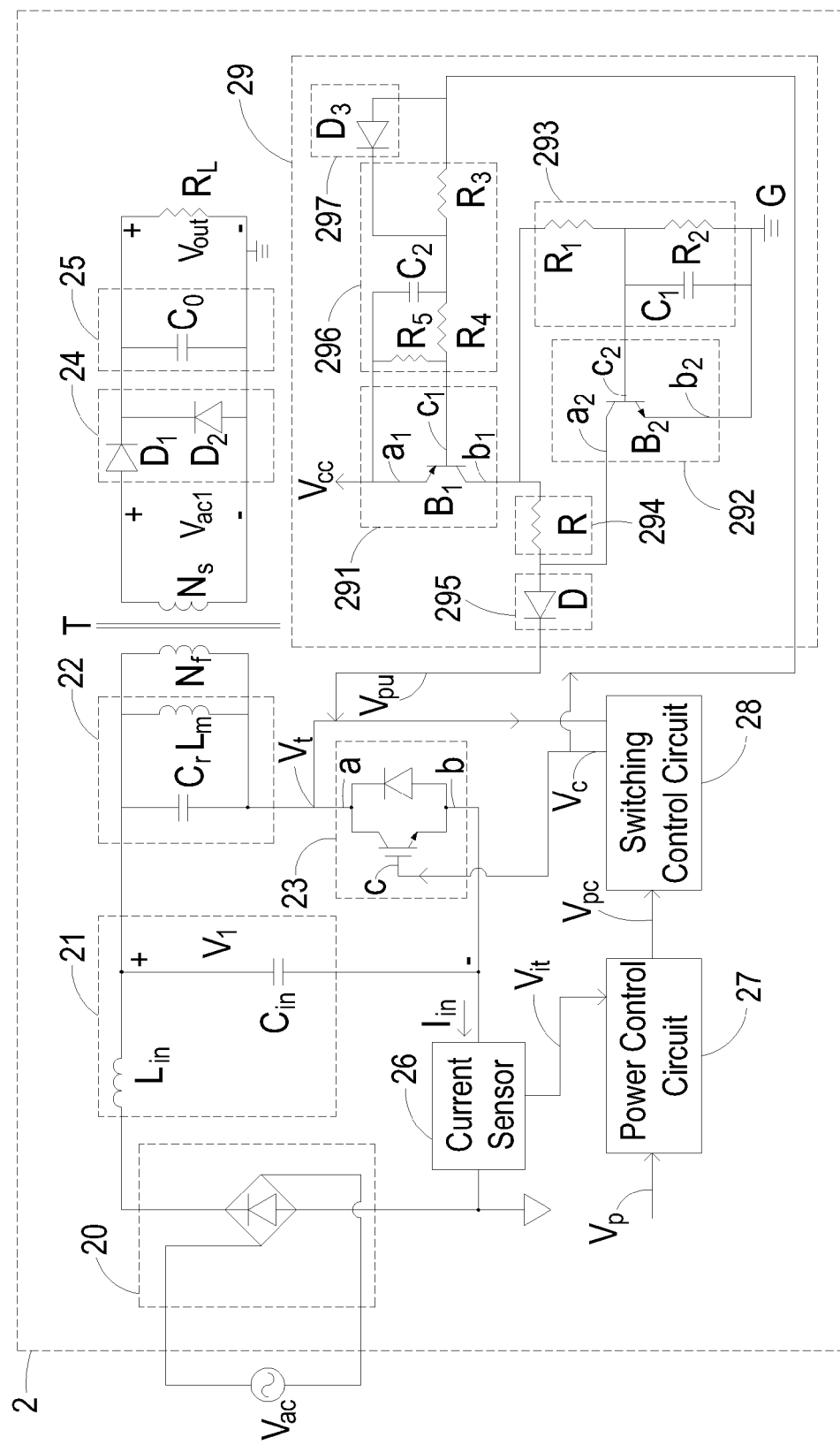
FIG. 5 is a circuit block diagram showing the circuitry of an AC-DC converter according to another embodiment of the invention.

Referring to FIG. 5, which shows a modified configuration of the AC-DC converter of FIG. 3. The configuration of the AC-DC converter 2 of this embodiment is similar to the configuration of the AC-DC converter 2 shown in FIG. 3. Compared to FIG. 3, the OFF time clamping circuit 29 of the AC-DC converter 2 of FIG. 5 further includes a second delay circuit 296 and a reset circuit 297. The second delay circuit 296 is connected between the control terminal c1 of the first switch circuit 291 and the control terminal c of the main switch circuit 23 for delaying the time for the control terminal c1 of the first switch circuit 291 to receive the control signal. As the main switch circuit 23 is switched from ON state to OFF state, the triggering signal Vpu will be delayed for a period of time and then delivered to the first current-conducting terminal a of the main switch circuit 23. In this way, the switching control circuit 28 will not immediately turn on the main switch circuit 23 again by the triggering signal Vpu. Instead, the switching control circuit 28 will detect if the terminal voltage Vt exceeds the specific voltage Vth by the resonance to determine whether the main switch circuit 23 is to be turned on or not. Therefore, the switching control circuit can control the switching operation of the main switch circuit 23.

In the foregoing embodiments, the second delay circuit 296 may be made up of a third resistor R3, a fourth resistor R4, a fifth resistor R5, and a second capacitor C2. The third resistor R3 is connected to the control terminal c of the main switch circuit 23. The fourth resistor R4 is connected between the third resistor R3 and the control terminal c1 of the first switch circuit 291. The fifth resistor R5 is connected in parallel with the second capacitor C2. Both of the fifth resistor R5 and the second capacitor C2 are connected between the first current-conducting terminal a1 of the first switch circuit 291 and the control terminal c1 of the first switch circuit 291.

The reset circuit 297 is connected to the second capacitor C2 for allowing the second capacitor C2 to be discharged through the reset circuit 297 and thus resetting the energy of the second capacitor C2. In this embodiment, the reset circuit 297 may be made up of a reset diode D3.

In conclusion, the embodiment of the invention provides an AC-DC converter having an OFF time clamping circuit to output a triggering signal when the main switch circuit is switched from ON state to OFF state. Even if the input AC voltage is too small and the terminal voltage at the first current-conducting terminal of the main switch circuit is lower than the specific voltage, the switching control circuit can turn on the main switch circuit again by the triggering signal. In this way, the switching control signal can control the switching operation of the main switch circuit even if the input AC voltage is too small. This would allow the main switch circuit to switch under zero-voltage conditions. Also, the inventive AC-DC converter undergoes a small voltage stress and is invulnerable. Besides, the inventive AC-DC converter may produce low noise and is made up of simple and cheap electronic elements and structures.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. An AC-DC converter, comprising:
a rectifier for rectifying an input AC voltage;
a first filter circuit connected to the rectifier, capable of generating an intermediate DC voltage;
a quasi-resonance circuit connected to the first filter circuit;
a main switch circuit connected to the quasi-resonance circuit;
a switching control circuit connected to a first current-conducting terminal of the main switch circuit and a control terminal of the main switch circuit for outputting a switching control signal to turn on or off the main switch circuit; and
an OFF time clamping circuit connected to the first current-conducting terminal of the main switch circuit and the control terminal of the main switch circuit for outputting a triggering signal when the main switch circuit is switched from ON state or OFF state, thereby controlling the main switch circuit to turn on or off;
wherein the OFF time clamping circuit further includes a first switch circuit having a first current-conducting terminal for receiving a supply DC voltage, a control terminal connected to the control terminal of the main switch circuit for receiving the switching control signal, and a second current-conducting terminal connected to an output end of the OFF time clamping circuit for transferring energy of supply DC voltage to the output end of the OFF time clamping circuit for boosting a level of the triggering signal to be higher than a specific voltage when the first switch circuit is turned on.

2. The AC-DC converter according to claim 1 further comprising a transformer having a primary winding connected to the first filter circuit and a secondary winding, and wherein the main switch circuit is connected to the primary winding for controlling energy transfer between the primary winding and the secondary winding.

3. The AC-DC converter according to claim 2 wherein the quasi-resonance circuit includes a resonant capacitor and a magnetizing inductance of the transformer respectively connected to the first current-conducting terminal of the main switch circuit for providing a resonance when the main switch circuit is operating.

4. The AC-DC converter according to claim 1 wherein the OFF time clamping circuit includes a reverse current isolation circuit connected to the first current-conducting terminal of the main switch circuit for preventing a reverse current from flowing from the first current-conducting terminal of the main switch circuit to the OFF time clamping circuit.

5. The AC-DC converter according to claim 4 wherein the reverse current isolation circuit includes a diode.

6. The AC-DC converter according to claim 4 wherein the OFF time clamping circuit further includes a current-limiting element connected to the reverse current isolation circuit for limiting a current outputted from the OFF time clamping circuit.

7. The AC-DC converter according to claim 6 wherein the current-limiting element includes a current-limiting resistor.

8. The AC-DC converter according to claim 1 wherein the OFF time clamping circuit further includes a second switch circuit and a first delay circuit, the first delay circuit is connected to the second current-conducting terminal of the first switch circuit, the control terminal of the second switch circuit and a ground terminal for allowing the second switch circuit to turn on after the first switch circuit is turned on, and wherein the second switch circuit includes a first current-conducting terminal connected to the output end of the OFF time clamping circuit and a second current-conducting terminal connected to the ground terminal, and wherein when the second switch circuit is turned on, a level of the triggering signal is descended to zero by the ground terminal.

9. The AC-DC converter according to claim 8 wherein the first switch circuit includes a PNP-type bipolar junction transistor, and the second switch circuit includes a NPN-type bipolar junction transistor.

10. The AC-DC converter according to claim 8 wherein the first delay circuit includes a first resistor, a second resistor, and a first capacitor, the first resistor is connected between the second current-conducting terminal of the first switch circuit and the control terminal of the second switch circuit, and the second resistor is connected between the first resistor and the ground terminal, and the first capacitor is connected in parallel with the second resistor.

11. The AC-DC converter according to claim 8 wherein the OFF time clamping circuit further includes a second delay circuit connected between the control terminal of the first switch circuit and the control terminal of the main switch circuit for allowing the OFF time clamping circuit to output the triggering signal when the main switch circuit is switched from ON state to OFF state.

12. The AC-DC converter according to claim 11 wherein the second delay circuit includes a third resistor, a fourth resistor, a fifth resistor, and a second capacitor, and wherein the third resistor is connected to the control terminal of the main switch circuit, the fourth resistor is connected between the third resistor and the control terminal of the first switch circuit, and the fifth resistor is connected in parallel with the second capacitor, and wherein both of the fifth resistor and the second capacitor are connected between the first current-conducting terminal of the first switch circuit and the control terminal of the first switch circuit.

13. The AC-DC converter according to claim 12 wherein the OFF time clamping circuit further includes a reset circuit connected to the second capacitor of the second delay circuit for allowing the second capacitor to be discharged therethrough for resetting the second capacitor.

14. The AC-DC converter according to claim 1 wherein a level of the switching control signal under an enabling state is higher than the supply DC voltage, and a level of the switching control signal under a disabling state is lower than the supply DC voltage.

15. The AC-DC converter according to claim 14 wherein when the main switch circuit is switched from ON state to OFF state, the main switch circuit is determined to be turned on by detecting if a terminal voltage at a first current-conducting terminal of the main switch circuit is higher than the specific voltage.

16. The AC-DC converter according to claim 15 wherein the switching control circuit turns on the main switch circuit again when the terminal voltage is lower than the specific voltage.

* * * * *